(12) United States Patent
Matsumoto et al.

(10) Patent No.: US 8,654,276 B2
(45) Date of Patent: Feb. 18, 2014

(54) ELECTRONIC APPARATUS (75) Inventors: Yoshiyuki Matsumoto, Yokohama (JP); Futoshi Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/015,437

(22) Filed: Jan. 27, 2011

(65) Prior Publication Data
US 2011/0187959 A1    Aug. 4, 2011

(30) Foreign Application Priority Data

Jan. 29, 2010    (JP) ................................ 2010-018824

(51) Int. Cl.
*G02F 1/1333*    (2006.01)
*G03B 17/18*    (2006.01)
*F21V 21/00*    (2006.01)

(52) U.S. Cl.
USPC ...... 349/60; 396/287; 362/217.1; 362/217.14

(58) Field of Classification Search
USPC .................... 349/58, 60; 396/287; 362/217.1, 362/217.11–217.17
See application file for complete search history.

(56) References Cited

U.S. PATENT DOCUMENTS

| | | | | |
|---|---|---|---|---|
| 4,300,071 A | * | 11/1981 | Dougherty et al. | 313/407 |
| 4,506,188 A | * | 3/1985 | Puhak | 313/405 |
| 4,916,357 A | * | 4/1990 | Nakamura et al. | 313/402 |
| 6,188,168 B1 | * | 2/2001 | Han et al. | 313/405 |
| 7,835,147 B2 | * | 11/2010 | Merz et al. | 361/679.34 |
| 7,902,474 B2 | * | 3/2011 | Mittleman et al. | 200/516 |
| 2008/0042332 A1 | * | 2/2008 | Tseng | 267/136 |
| 2008/0088600 A1 | * | 4/2008 | Prest et al. | 345/173 |
| 2008/0174714 A1 | | 7/2008 | Saiki et al. | |

FOREIGN PATENT DOCUMENTS

| | | | | | |
|---|---|---|---|---|---|
| JP | 10-336493 A | | 12/1998 | | |
| JP | 2001-067000 A | | 3/2001 | | |
| JP | 2003-189144 A | | 7/2003 | | |
| JP | 2007-310218 A | * | 11/2007 | ............ | G02F 1/1333 |
| JP | 2008-203829 A | | 9/2008 | | |

\* cited by examiner

*Primary Examiner* — Mark Robinson
*Assistant Examiner* — Robert Tavlykaev
(74) *Attorney, Agent, or Firm* — Canon USA Inc. IP Division (57) ABSTRACT

An electronic apparatus includes: a display panel, a retention member retaining the display panel, and an external case covering the retention member. The retention member has a retention main body portion retaining the display panel and a plurality of fastening portions for fixing to the external case. At least one of the plurality of fastening portions has a displacement absorbing portion absorbing displacement of the retention member.

4 Claims, 6 Drawing Sheets

ELECTRONIC APPARATUS

BACKGROUND OF THE INVENTION

1. Field of the Invention

The present invention relates to an electronic apparatus equipped with a display panel.

2. Description of the Related Art

Conventionally, there has been widely used an electronic apparatus, such as a camera, a video camera, or a mobile phone, which is equipped with a liquid crystal display panel. The liquid crystal display panel has a liquid crystal layer between two transparent substrates. If some external force is applied to this liquid crystal layer, color irregularity will be generated on the display surface of the liquid crystal display panel.

Accordingly, it is necessary to protect the liquid crystal display panel against such external force. For example, Japanese Patent Application Laid-Open No. 2008-203829 discusses an electronic apparatus in which there is provided a protective plate parallel to the liquid crystal display panel as a retention structure for improving strength against external pressure on the liquid crystal display panel.

However, in the construction of the electronic apparatus discussed in Japanese Patent Application Laid-Open No. 2008-203829, it is necessary to separately provide a retention frame and a protective plate apart from the liquid crystal display panel, resulting in an increase in the number of components and a complicated structure. Further, due to the construction in which the function of the protective plate becomes effective after the liquid crystal panel has been deformed to a certain degree, it is rather difficult to suppress initial deformation of the liquid crystal panel.

SUMMARY OF THE INVENTION

According to an aspect of the present invention, an electronic apparatus includes: a display panel,
a retention member retaining the display panel, and
an external case to which the retention member is fixed,
wherein the retention member has a retention main body portion retaining the display panel and a plurality of fastening portions for fixing to the external case, and
wherein at least one of the plurality of fastening portions has a displacement absorbing portion absorbing displacement of the retention member.

According to the present invention, deformation of a display panel is suppressed by a small number of components, which enables to prevent generation of color irregularity on a display surface of the display panel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following, an exemplary embodiment of the present invention will be described with reference to the drawings. In the present exemplary embodiment, a digital single-lens reflex camera (hereinafter referred to as a camera) will be taken as an example of an electronic apparatus equipped with a display panel. In the drawings, the direction in which shooting is performed with the camera is indicated by a symbol Fr as the front side, and the direction opposite thereto is indicated by a symbol Rr as the rear side; the right-hand side with respect to the shooting direction is indicated by a symbol R, and the left-hand side is indicated by a symbol L.

Figure 1A:
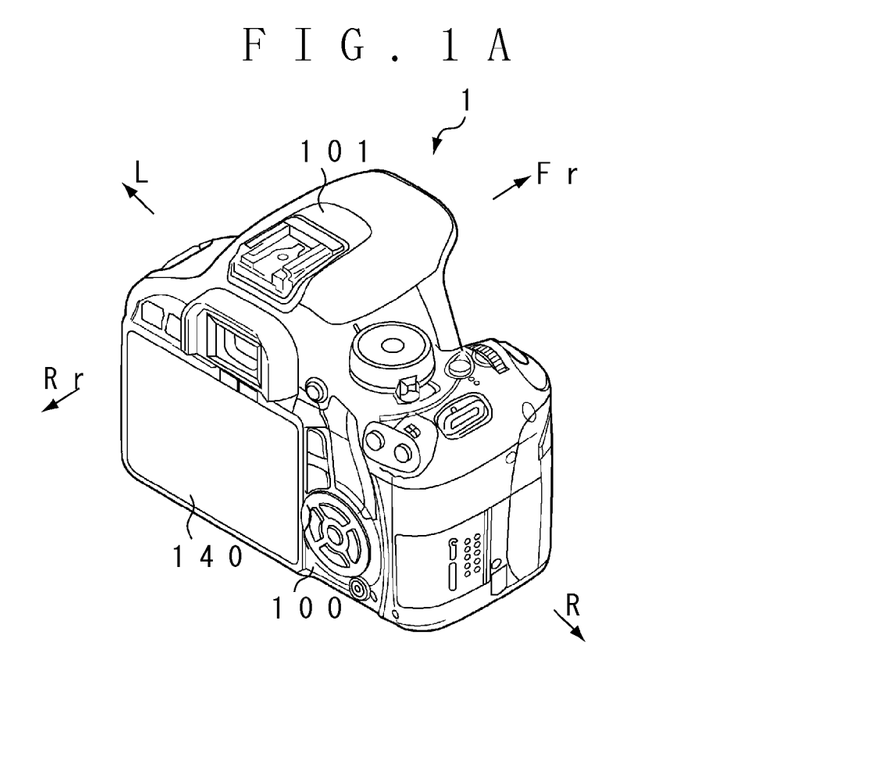
FIGS. 1A and 1B are perspective views illustrating the outward appearance of a camera according to an exemplary embodiment.
Figure 1B:
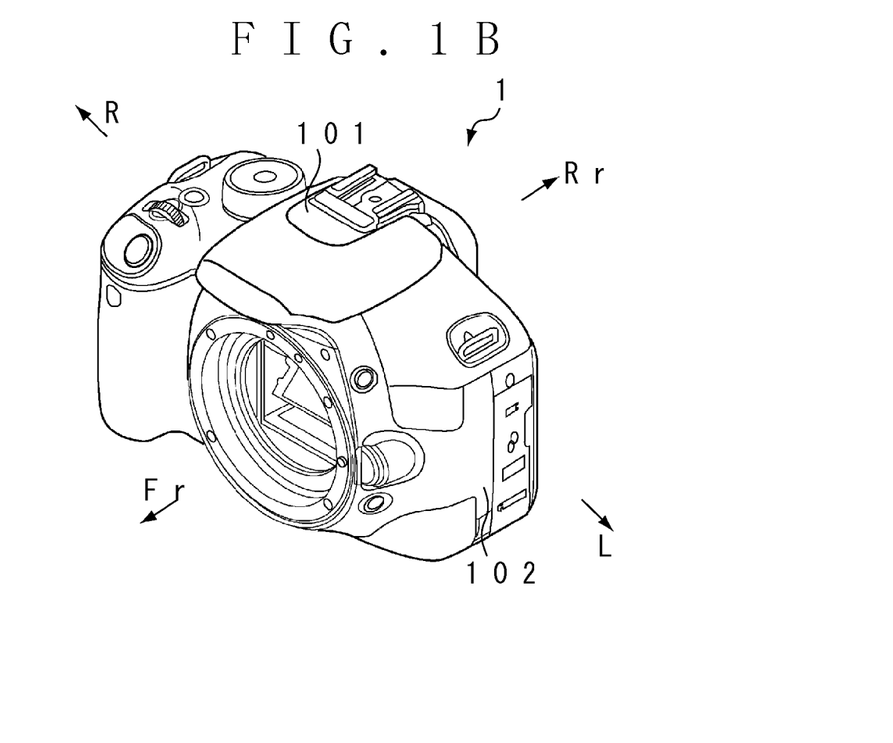

FIGS. 1A and 1B are perspective views illustrating the outward appearance of a camera according to the present exemplary embodiment. FIG. 1A is a perspective view of the camera as seen from the rear side (back side), and FIG. 1B is a perspective view of the same as seen from the front side. As shown in FIGS. 1A and 1B, a camera 1 includes a back cover unit 100, a top cover unit 101, a front cover unit 102, etc. Mounted on the back cover unit 100 are various operation switches described below and a TFT display panel 140 as the display panel. By using the various operation switches and the TFT display panel 140, the user can change the photographing condition, and check and edit the image taken.

Arranged in the top cover unit 101 are a power switch, a mode dial, an electronic dial, a release button, and a built-in strobe, making it possible to perform the operations of turning on/off the power switch, selecting the scene to be shot, setting the shooting condition, releasing, etc. The front cover unit 102 is an external unit covering the lens mounting side; it has a grip unit and is equipped with an aperture set button and a strobe pop-up button.

Figure 2A:
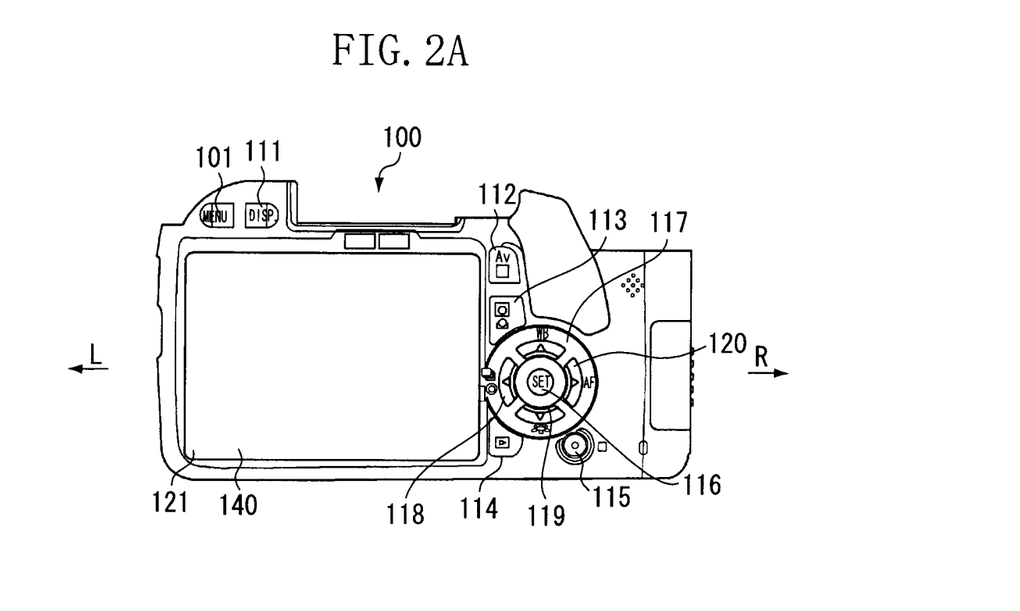
FIGS. 2A and 2B illustrate the construction of a back cover unit according the present exemplary embodiment.
Figure 2B:
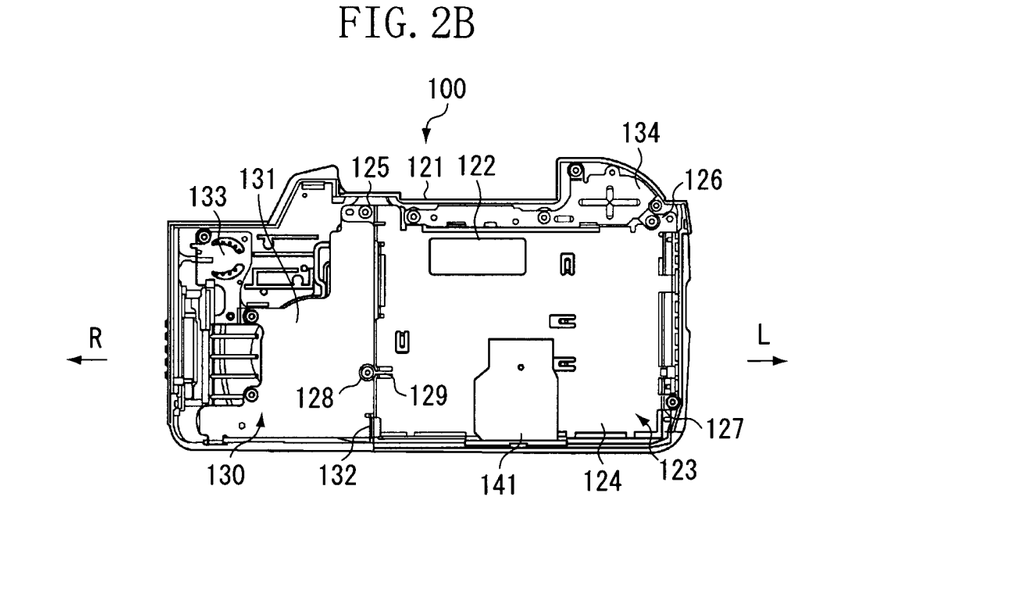

FIGS. 2A and 2B illustrate the construction of the back cover unit. FIG. 2A is a rear view of the back cover unit 100, and FIG. 2B is a front view of the back cover unit 100. A back cover 121 as an external case gives a proper outward appearance to the back cover unit 100. As shown in FIG. 2A, the back cover unit 100 is provided with a menu button 110, a display button 111, an audiovisual (AV) button 112, a quick-setting-button/direct-printing-button 113, a reproducing button 114, and a trash button 115. Further, the back cover 121 is provided with a setting button 116, an upper cross button 117, a left cross button 118, a lower cross button 119, and a right cross button 120. These operation switches are arranged so as to be exposed from the exterior of the back cover 121.

As shown in FIG. 2B, a TFT holder 123 as a retention member is arranged in front of the TFT display panel 140 (i.e. opposite to TFT-display-panel-140 display surface side). The TFT holder 123 retains a TFT module 122 described below including the TFT display panel 140. In FIG. 2B, a portion of the TFT module appears through a rectangular opening formed in the TFT holder 123. The TFT holder 123 is fixed to the back cover 121 at four positions by screws.

The TFT module 122 includes the TFT display panel 140, a light guide plane (not shown), a backlight, a resin package, a metal package, a flexible substrate 141 for effecting electrical connection between the TFT display panel 140 and the camera main body, etc. Further, in the TFT module 133 of the present exemplary embodiment, a draw-out portion of the flexible substrate 141 is provided on the bottom surface side of the camera 1. More specifically, the bottom surface side of the metal package of the TFT module 122 is cut out in order to draw out the flexible substrate 141. Thus, the rigidity of the bottom surface side of the TFT module 122 is lower than that of the other portions. The flexible substrate 141 extends from the TFT module 122 over a draw-out portion 124a (See FIG. 4) at the lower end of the TFT holder 123 to be thereby drawn out forwards from behind the TFT holder 123, so that it can be connected to the camera main body.

Further, arranged on the back cover unit 100 are a switch holder 130 as a switch retention member, a speaker holder 133, and a display-off sensor holder 134 (hereinafter referred to as the DOS holder). The switch holder 130 retains various operation switches. The speaker holder 133 retains a speaker (not shown). The DOS holder 134 retains a display-off sensor (not shown).

Figure 3:
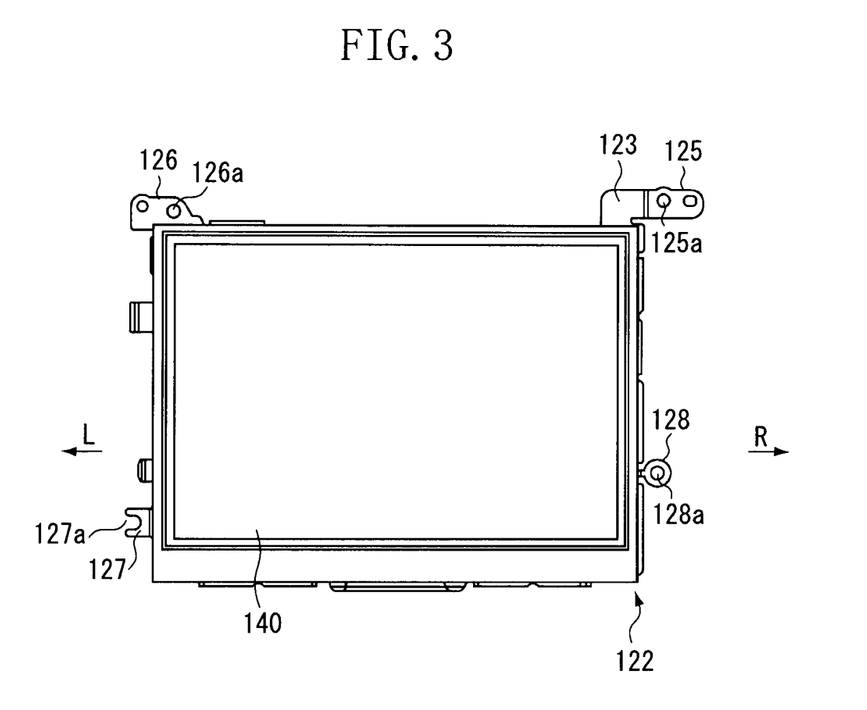
FIG. 3 illustrates how a thin film transistor (TFT) module according to the present exemplary embodiment is fixed to a TFT holder.

FIG. 3 illustrates the TFT module 122 as fixed to the TFT holder 123. The TFT module 122 is retained by the TFT holder 123 from a side surface while urged by a spring (not shown). Thus, when the TFT holder 123 is deformed, the TFT module 122 also receives a force causing it to undergo deformation integrally. More specifically, as a result of the deformation of the TFT module 122, the TFT display panel 140 and a diffusion panel (not shown) are deformed, resulting in generation of color irregularity on the display surface of the TFT display panel 140.

Figure 4:
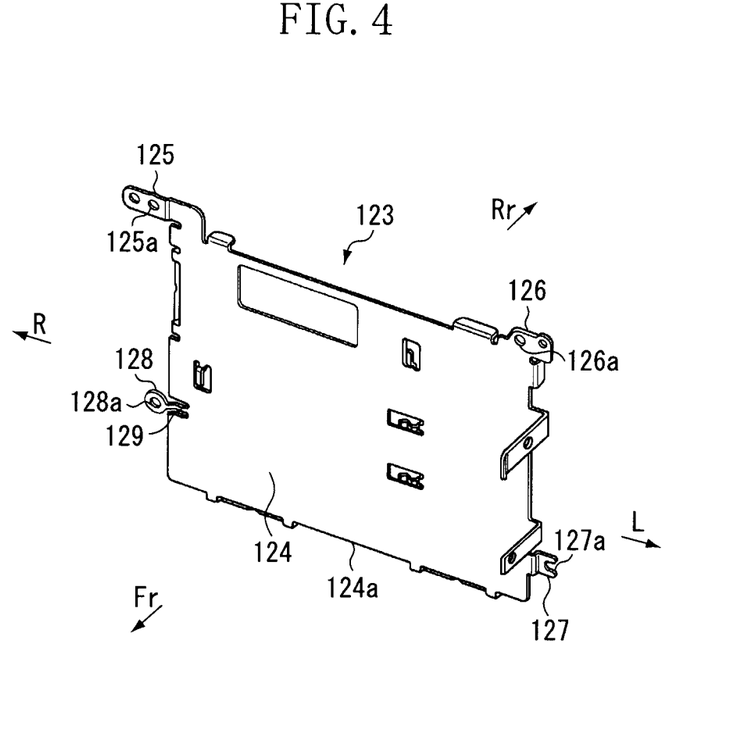
FIG. 4 is a perspective view of the TFT holder of the present exemplary embodiment.

Next, the TFT holder 123 will be described in detail. FIG. 4 is a perspective view of the TFT holder 123 as seen from the front side. The TFT holder 123 consists of a metal plate, which is formed by press working. The TFT holder 123 has a holder main body portion 124 as a retention main body portion retaining the TFT module 122, and a plurality of fastening portions 125 through 128 to be fixed to the back cover 121, which are formed integrally.

The fastening portion 125 extends to the right from the upper right-hand end of the rectangular holder main body portion 124. The fastening portion 125 connects the TFT holder 123 and the switch holder 130 electrically to each other. Further, it is possible to pass a fixation screw through a fastening hole 125a of the fastening portion 125, fastening both the TFT holder 123 and the switch holder 130 to the back cover 121. Here, like the TFT holder 123, the switch holder 130 is a member consisting of a metal plate. Thus, by electrically connecting the TFT holder 123 and the switch holder to each other, a large ground consisting of metal members connected together is obtained, making it possible to reduce and shield radiation noise. On the other hand, due to the form in which the switch holder 130 is held between the TFT holder 123 and the back cover 121, the mounting height (as measured in the longitudinal direction in FIG. 4) of the fastening portion 125 varies by an amount corresponding to the thickness tolerance of the switch holder 130.

The fastening portion 126 extends to the left from the upper left-hand end of the holder main body portion 124. The fastening portion 126 connects the TFT holder 123 and the DOS holder 134 electrically to each other. Further, by passing a fixation screw through a fastening hole 126a of the fastening portion 126, it is possible to fasten both the TFT holder 123 and the DOS holder 134 to the back cover 121. Further, the TFT holder 123 is held between the DOS holder 134 and the back cover 121. More specifically, nothing exists between the TFT holder 123 and the back cover 121, so that in the fastening portion 126, the mounting height of the TFT holder 123 varies less than in the fastening portion 125.

The fastening portion 127 extends to the left from the lower left-hand side of the holder main body portion 124. By passing a fixation screw through a semi-circular fastening hole 127a of the fastening portion 127, it is possible to fix the TFT holder 123 to the back cover 121. With the fastening portion 127, solely the TFT holder 123 is fixed to the back cover 121, and no co-fastening is performed.

The fastening portion 128 extends to the right from the lower right-hand side of the holder main body portion 124. The fastening portion 128 connects the TFT holder 123 and the switch holder 130 electrically to each other. By passing a fixation screw through a fastening hole 128a of the fastening portion 128, it is possible to fasten both the TFT holder 123 and the switch holder 130 to the back cover 121. More specifically, the fastening portion 128 fixes the TFT holder 123 to the back cover 121, with the switch holder 130 being held between the TFT holder 123 and the back cover 121. As in the case of the fastening portion 125, in the case of the fastening portion 128, the switch holder 130 is held between the TFT holder 123 and the back cover 121. Thus, variation is generated in the mounting height of the fastening portion 128 by an amount corresponding to the thickness tolerance of the switch holder 130.

Here, when the TFT holder 123 is fixed to the back cover 121 by using fixation screws, the TFT holder 123 undergoes deformation according to the shift amount of the mounting height of the TFT holder 123 at each of the four fastening portions 125 through 128. For the above-mentioned reason, this deformation generates color irregularity on the display surface of the TFT display panel 140. Therefore, in the present exemplary embodiment, there is integrally formed between the fastening portion 128 and the holder main body portion 124, a displacement absorbing portion 129 absorbing the deformation of the TFT holder 123 due to the shift amount of the mounting height at each fastening portion. The displacement absorbing portion 129 connects the holder main body portion 124 and the fastening portion 128 with low rigidity. Thus, the portion between the holder main body portion 124 and the fastening portion 128 is capable of bending due to the displacement absorbing portion 129.

Figure 5A:
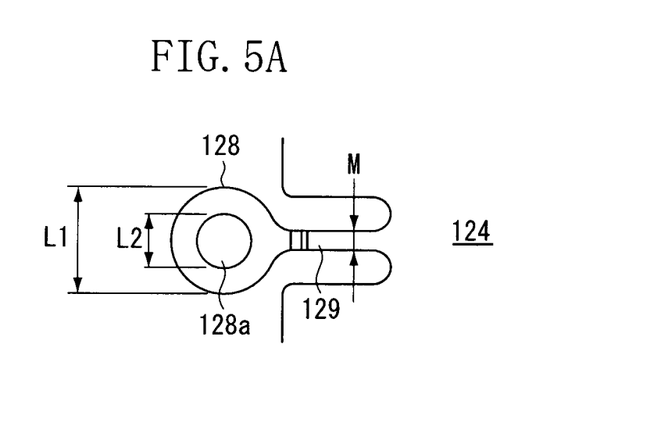
FIGS. 5A, 5B, and 5C are diagrams illustrating an example of a displacement absorbing portion according the present exemplary embodiment.
Figure 5B:
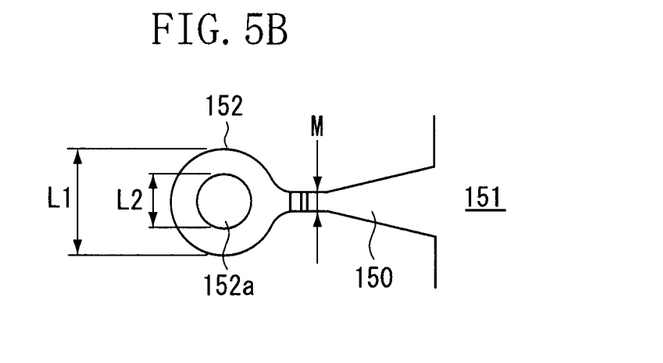
Figure 5C:
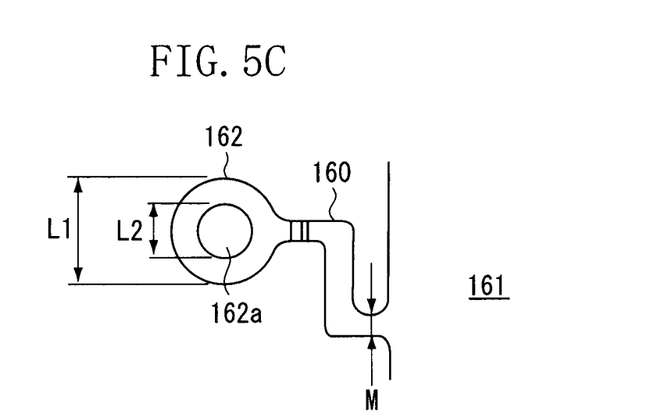

FIGS. 5A through 5C are enlarged views illustrating the configurations of displacement absorbing portions. FIG. 5A illustrates the configuration of the displacement absorbing portion 129 of the present exemplary embodiment. FIGS. 5B and 5C illustrate the configurations of displacement absorbing portions according to other exemplary embodiments. The displacement absorbing portion 129 shown in FIG. 5A is formed in the holder main body portion 124 by forming two notches in the holder main body portion 124. The plate width M of the displacement absorbing portion 129 is smaller than the outer diameter L1 of the fastening portion 128, and smaller than the inner diameter L2 of the fastening hole 128. The place where the displacement absorbing portion 129 is formed is not restricted to the interior of the holder main body portion 124; it may also protrude outwards from the holder main body portion 124.

A displacement absorbing portion 150, shown in FIG. 5B, is gradually reduced in the plate width M as it extends from a holder main body portion 151 to a fastening portion 152. More specifically, in the vicinity of the holder main body portion 151, the plate width M of the displacement absorbing portion 150 is substantially the same as the inner diameter L2 of a fastening hole 152a of a fastening portion 152; in the vicinity of the fastening portion 152, it is smaller than the inner diameter L2 of the fastening hole 152a. A displacement absorbing portion 160, shown in FIG. 5C, is bent at some midpoint as it extends from a holder main body portion 161 to a fastening portion 162. As illustrated here, the displacement absorbing portion is not restricted to a particular configuration so long as it is of a configuration allowing the absorption of deformation of the TFT holder 123.

The displacement absorbing portion 129 can absorb, through bending, deformation of the holder main body portion 124 attributable to tolerance variation in the height direction of the fastening portion 128 and of the fastening portion 125, and deformation of the holder main body portion 124 attributable to tolerance variation in the height direction of the fastening portion 128 and of the fastening portion 127. Thus, the displacement absorbing portion 129 can suppress deformation of the holder main body portion 124 fixing the TFT module 122 of the TFT holder 123 in position.

Further, the displacement absorbing portion 129 can also absorb deformation of the TFT holder 123 due to an external force generated when the user depresses an operation switch of the back cover unit 100. More particularly, when the operation switch is depressed, an external force causing forward deformation of the switch holder 130 is generated. At this time, also the fastening portion 128 of the TFT holder 123, fastened together with the switch holder 130, moves. Thus, although the fastening portion 128 and the fastening portion 125 are forcibly displaced in an opposite direction, or the fastening portion 128 and the fastening portion 127 are forcibly displaced in an opposite direction, such deformation can be absorbed through bending of the displacement absorbing portion 129.

The displacement absorbing portion 129 is formed, of the fastening portions 125 through 128, at the fastening portion 128, which is situated in the vicinity of a draw-out portion 124a of the TFT holder 123. Thus, the displacement absorbing portion 129 can further suppress deformation of the draw-out portion 124a of the TFT module 122, which is of low rigidity. In this way, the displacement absorbing portion 129 can suppress generation of color irregularity on the display surface of the TFT display panel 140 while electrically connecting the TFT holder 123 and the switch holder 130.

Although in the present exemplary embodiment described above, the displacement absorbing portion 129 is formed at the fastening portion 128, the present invention is not limited to such a case. While the effect of suppressing deformation of the draw-out portion of the TFT module 122 of low rigidity is to be expected so long as the displacement absorbing portion 129 is formed at one of the fastening portion 127 and the fastening portion 128 holding the draw-out portion 124a of the TFT holder 123 therebetween, such displacement absorbing portion may also be formed at both of them. In the case where the displacement absorbing portion is formed at one of the fastening portions, it is possible to absorb variation in the tolerance of the components by forming the displacement absorbing portion at a fastening portion with a co-fastening member or a fastening portion with a large number of co-fastening members, so that the effect of suppressing color irregularity on the display surface of the TFT display panel 140 is superior.

Figure 6:
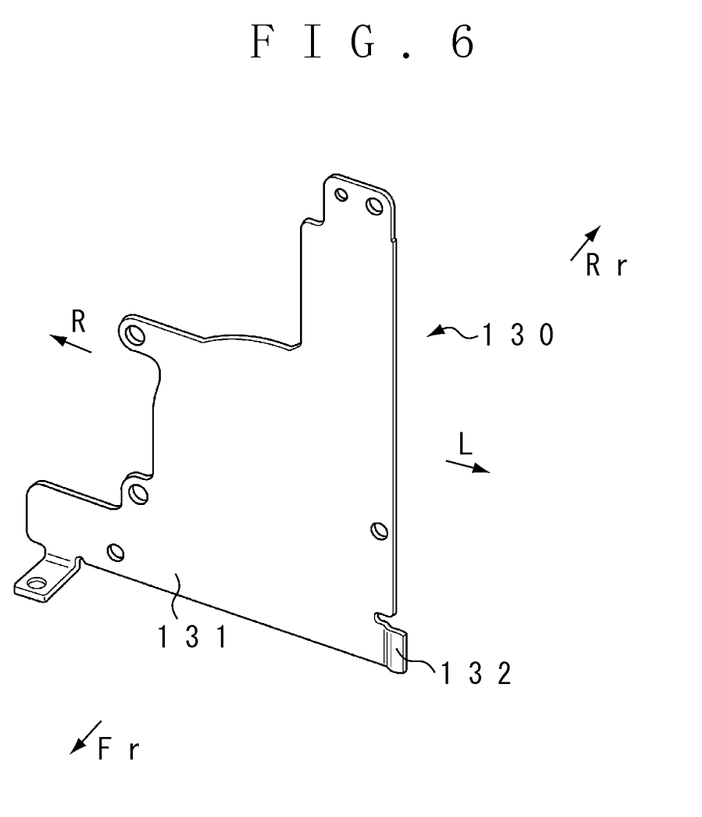
FIG. 6 is a perspective view of a switch holder according to the present exemplary embodiment.

On the other hand, the displacement absorbing portion 129 tends to deform under load. Thus, in the present exemplary embodiment, the switch holder 130, which is a member adjacent to the TFT holder 123, is provided with a deformation prevention structure. FIG. 6 is a perspective view of the switch holder as seen from the front side. The switch holder 130 has a flat portion 131 and a reinforcing portion 132. The flat portion 131 receives the load when the operation switch is operated. The reinforcing portion 132 constitutes the deformation prevention structure; it protrudes from the lower left-hand end of the flat portion 131 toward the TFT holder 123. When the switch holder 130 is seen from a direction orthogonal to the plate surface of the TFT holder 123 (the longitudinal direction) in the state in which it is fixed to the back cover 121, the reinforcing portion 132 overlaps with the TFT holder 123 (See FIG. 2B). In normal use, the reinforcing portion 132 and the TFT holder 123 are spaced apart from each other in the longitudinal direction. More specifically, there is a predetermined gap between the reinforcing portion 132 and the TFT holder 123.

When the camera 1 receives a shock as a result of a fall or the like, the TFT holder 123 also moves due to the shock load received from the TFT module 122. At this time, the displacement absorbing portion 129 is capable of bending, so that the TFT holder 123 easily moves; however, since the TFT holder 123 abuts the reinforcing portion 132, it is possible to prevent movement or deformation of the TFT holder 123 to a degree beyond a predetermined level. The reason for providing a gap between the TFT holder 123 and the reinforcing portion 132 is to prevent the TFT holder 123 and the switch holder 130 from coming into contact with each other due to variation in tolerance to hinder the absorption of the deformation of the TFT holder 123 by the displacement absorbing portion 129.

In this way, in the present exemplary embodiment, a displacement absorbing portion is formed on at least one of a plurality of fastening portions formed on the TFT holder, whereby it is possible to suppress deformation of the display panel with a small number of components, making it possible to prevent generation of color irregularity on the display surface of the display panel.

The present invention is not restricted to the specific exemplary embodiment described in detail above but also covers various modifications without departing from the gist of the present invention.

For example, while in the exemplary embodiment described above the TFT holder has four fastening portions one of which has a displacement absorbing portion, the present invention is not limited to that embodiment. A plurality of fastening portions may have at least one displacement absorbing portion. Further, while the present exemplary embodiment is applied to a camera, it is not limited to the camera; the present invention is applicable to any type of electronic apparatus so long as it is equipped with a display panel.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-018824 filed Jan. 29, 2010, which is hereby incorporated by reference herein in its entirety.

What is claimed is:

1. An electronic apparatus comprising:
   a display panel;
   a first retaining member retaining the display panel; and
   an operation member;
   a second retaining member retaining the operation member; and
   an external member to which the first retaining member and the second retaining member are fixed, wherein the first retaining member has a retaining portion retaining the display panel, a first fixed portions and a second fixed portion, and wherein the second retaining member is arranged between the external member and the first retaining member, wherein the first fixed portion and the second fixed portion are fixed to the external member together with the second retaining member, wherein the second fixed portion has a displacement absorbing portion absorbing displacement of the first retaining member, wherein the second retaining member has a reinforcing portion for preventing deformation of the first retaining member, and wherein the second fixed portion is provided between the first fixed portion and a portion overlapping with the reinforcing portion.

2. The electronic apparatus according to claim 1,
wherein the displacement absorbing portion is integrally formed between the retaining portion and the second fixed portion.

3. The electronic apparatus according to claim 1,
wherein the displacement absorbing portion is formed as a plate connecting the retaining portion and the second fixed portion, and wherein a plate width of the displacement absorbing portion is smaller than an external dimension of the second fixed portion.

4. The electronic apparatus according to claim 1,
wherein the first retaining member has a plurality of third fixed portions for being fixed to the external member, wherein the display panel has a flexible substrate, and wherein the first retaining member has a draw-out portion drawing out the flexible substrate, and wherein the draw-out portion is formed between the third fixed portion and the second fixed portion.

* * * * *